Aug. 14, 1945.   J. B. ARMITAGE   2,382,934
MACHINE TOOL TRANSMISSION AND CONTROL MECHANISM
Filed March 11, 1940   4 Sheets-Sheet 1

INVENTOR
JOSEPH B. ARMITAGE
BY W. D. O'Connor
ATTORNEY

Aug. 14, 1945.  J. B. ARMITAGE  2,382,934
MACHINE TOOL TRANSMISSION AND CONTROL MECHANISM
Filed March 11, 1940  4 Sheets-Sheet 2
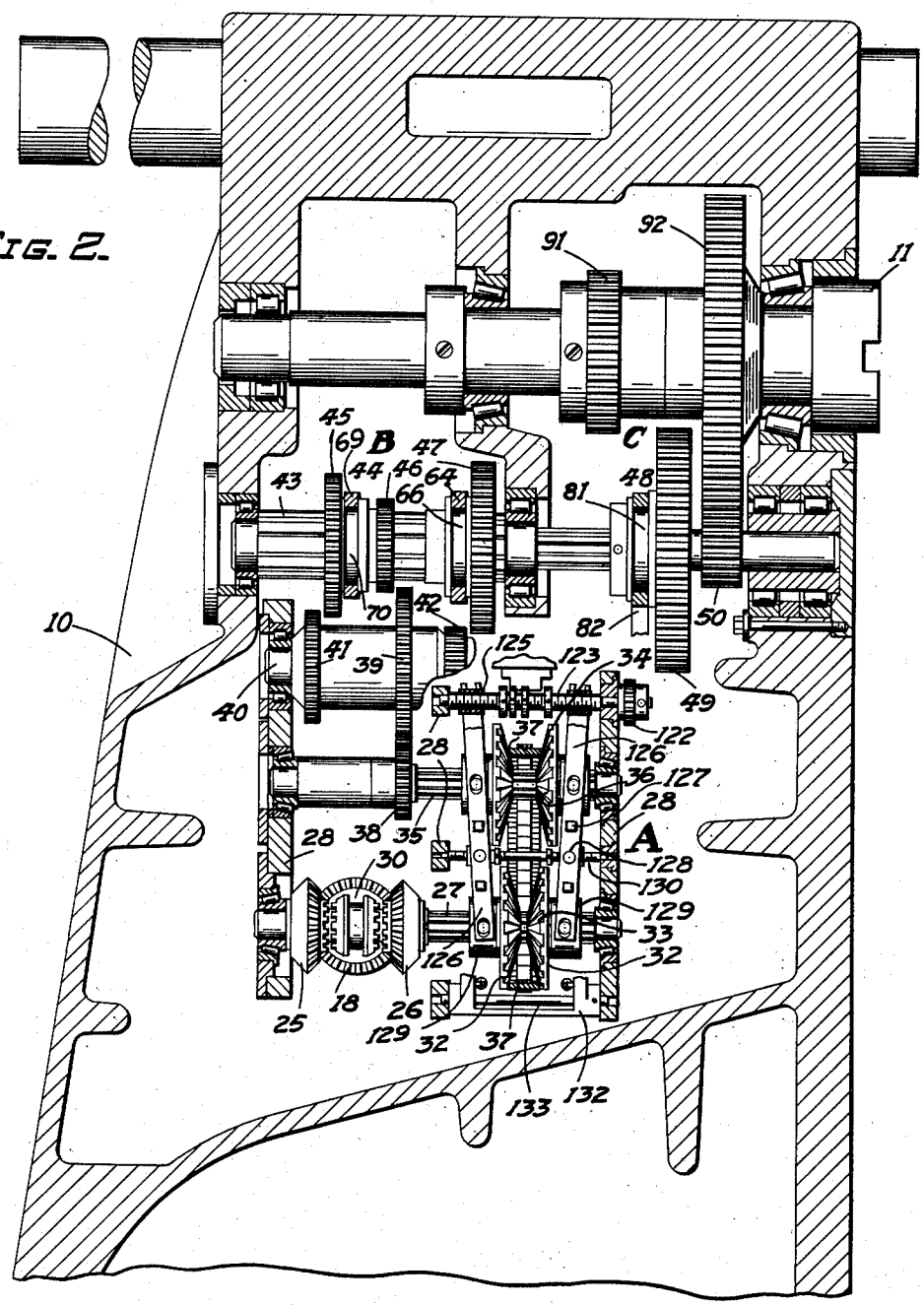
INVENTOR
JOSEPH B. ARMITAGE
BY W. D. O'Connor
ATTORNEY Aug. 14, 1945.     J. B. ARMITAGE     2,382,934
MACHINE TOOL TRANSMISSION AND CONTROL MECHANISM
Filed March 11, 1940     4 Sheets-Sheet 3

INVENTOR
JOSEPH B. ARMITAGE
BY W. D. O'Connor
ATTORNEY

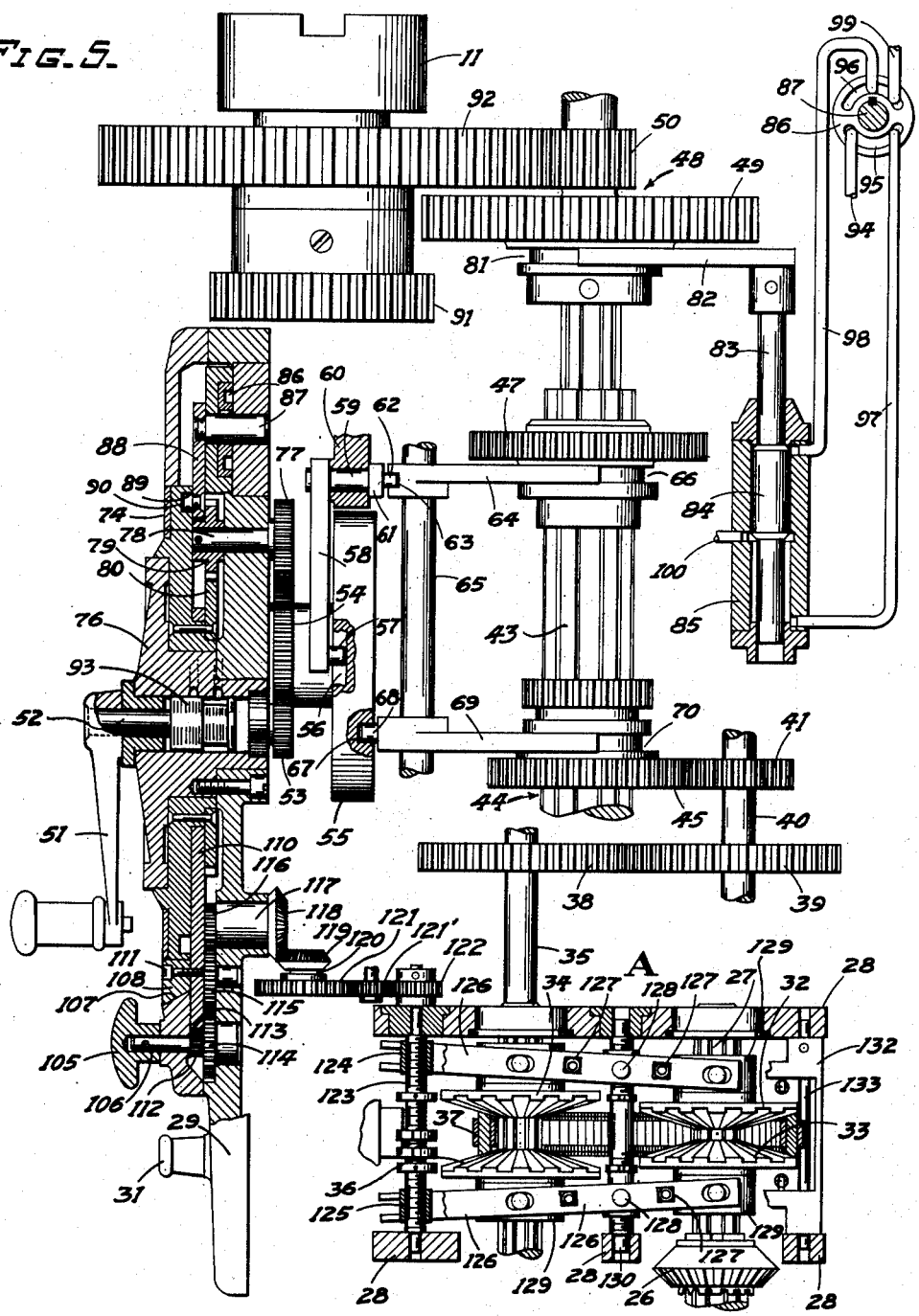

Patented Aug. 14, 1945

2,382,934

UNITED STATES PATENT OFFICE 2,382,934

MACHINE TOOL TRANSMISSION AND CONTROL MECHANISM

Joseph B. Armitage, Wauwatosa, Wis., assignor to Kearney & Trecker Corporation, West Allis, Wis., a corporation of Wisconsin Application March 11, 1940, Serial No. 323,350

9 Claims. (Cl. 90—18)

This invention relates, generally, to improvements in machine tools, and more particularly to an improved transmission and control mechanism for actuating a movable element of a machine tool.

A general object of the invention is to provide improved transmission and control mechanism for effecting and controlling movements of a machine tool element.

Another object of the invention is to provide an improved transmission and control mechanism for a machine tool, including a positive-infinitely-variable speed drive mechanism.

Another object is to provide an improved machine tool power transmission system including a fixed step speed changer and a positive-infinitely-variable speed changer operatively connected in series relationship, together with control and indicating mechanism arranged to effect cooperative adjustments of the speed changers for establishing any predetermined driving ratio within their full range of operation.

Another object is to provide an improved transmission mechanism for a milling machine, including a positive - infinitely - variable speed changing mechanism housed within the hollow column of the machine.

Another object is to provide an improved control mechanism for cooperatively adjusting a fixed step speed changer and an infinitely-variable speed changer connected in series relationship.

Another object is to provide an improved transmission and control mechanism for a milling machine, including a selective speed gear changing mechanism driven by a positive-infinitely-variable drive mechanism, a manually operable control means including a dial adapted to be moved in accordance with the position of adjustment of the selective speed gear changing mechanism, and a manually operable control means including an indicator element readable on the dial and adapted to be moved in accordance with the position of adjustment of the positive-infinitely-variable drive mechanism to indicate on the dial the driving speed resulting from the cooperative action of the adjusted mechanisms.

Another object is to provide an improved power transmission system for a machine tool, including a fixed step speed changing mechanism and a range changing mechanism connected in series relationship and arranged to be driven by a positive-infinitely-variable speed device, the mechanisms being so proportioned as to provide for continuous speed changes throughout their full range of operation.

According to this invention, a driven member of a machine tool, for example the tool supporting spindle of a milling machine, is arranged to be actuated at any speed whatsoever throughout a relatively wide range of operation. This is accomplished by means of an improved power transmission mechanism in which a fixed step speed changing mechanism of relatively wide range is combined with an infinitely-variable speed mechanism of limited range, the operation of the mechanisms being so correlated and controlled as to provide infinitely-variable speed changes throughout the full compass of the machine. To provide for positively controlling and accurately predetermining the speed of the driven member, the infinitely-variable speed changing mechanism is preferably of the positive drive type, and in order to relieve it from the necessity of transmitting high torque, it is arranged to be driven directly by the power source at relatively high speed. The positive-infinitely-variable mechanism drives a sliding gear speed changer capable of effecting a series of driving ratios arranged in steps so selected that the infinitely-variable mechanism bridges between the successive steps in manner to provide continuous speed variation. From the sliding gear speed changer, the power is transmitted to the tool supporting spindle by means of a range changing mechanism adapted to operate in either a high speed range or a low speed range, each range being capable of utilizing the full compass of the combined speed changers without overlapping or discontinuity between them. The range changing mechanism and the sliding gear speed changer are arranged to be adjusted cooperatively by a single control lever which has associated with it an indicating dial movable to different positions corresponding with the various settings of the fixed step mechanism. The positive-infinitely-variable mechanism is likewise provided with a controlling member which has associated with it an indicator disposed to cooperate with the indicating dial in manner to indicate thereon the exact spindle speed resulting from the combined setting of the range changing mechanism, the sliding gear speed changer, and the positive-infinitely-variable mechanism.

In a preferred embodiment of the invention constituting the spindle driving train of a milling machine shown in the accompanying drawings, the improved transmission mechanism is housed within the column of the machine and a part of the transmission including the positive-infinitely-variable drive mechanism and the entire control apparatus, is mounted in a manner to permit unitary removal from the machine column.

The foregoing and other objects of the invention, which will become more fully apparent from the following detailed specification, may be achieved by the particular transmission and control mechanism described herein by way of example as illustrating a preferred embodiment of the invention, in connection with the accompanying drawings, in which:

Fig. 2 is a vertical longitudinal sectional view through the same part of the machine, taken on the line 2—2 of Figure 1;

Fig. 5 is a schematic diagram showing the operative relationship of the various elements of the transmission and control mechanism as it is incorporated in the milling machine spindle drive.

Referring more particularly to the drawings, the machine tool there shown as illustrative of apparatus incorporating a power transmission mechanism constituting a preferred embodiment of the invention, is a milling machine of the well known horizontal spindle type generally similar to the machine more fully shown and described in my co-pending patent application Serial No. 146,581, filed June 7, 1937, which issued May 6, 1941 as Patent No. 2,240,973. As appears in Figs. 1 and 2 of the drawings, the milling machine structure comprises essentially an upstanding column 10 which serves to carry the usual work supporting table (not shown) and that has rotatably journalled near its top a working member constituted by the usual horizontally disposed tool supporting spindle 11 positioned in cooperating relationship with the work table.

Figure 1:
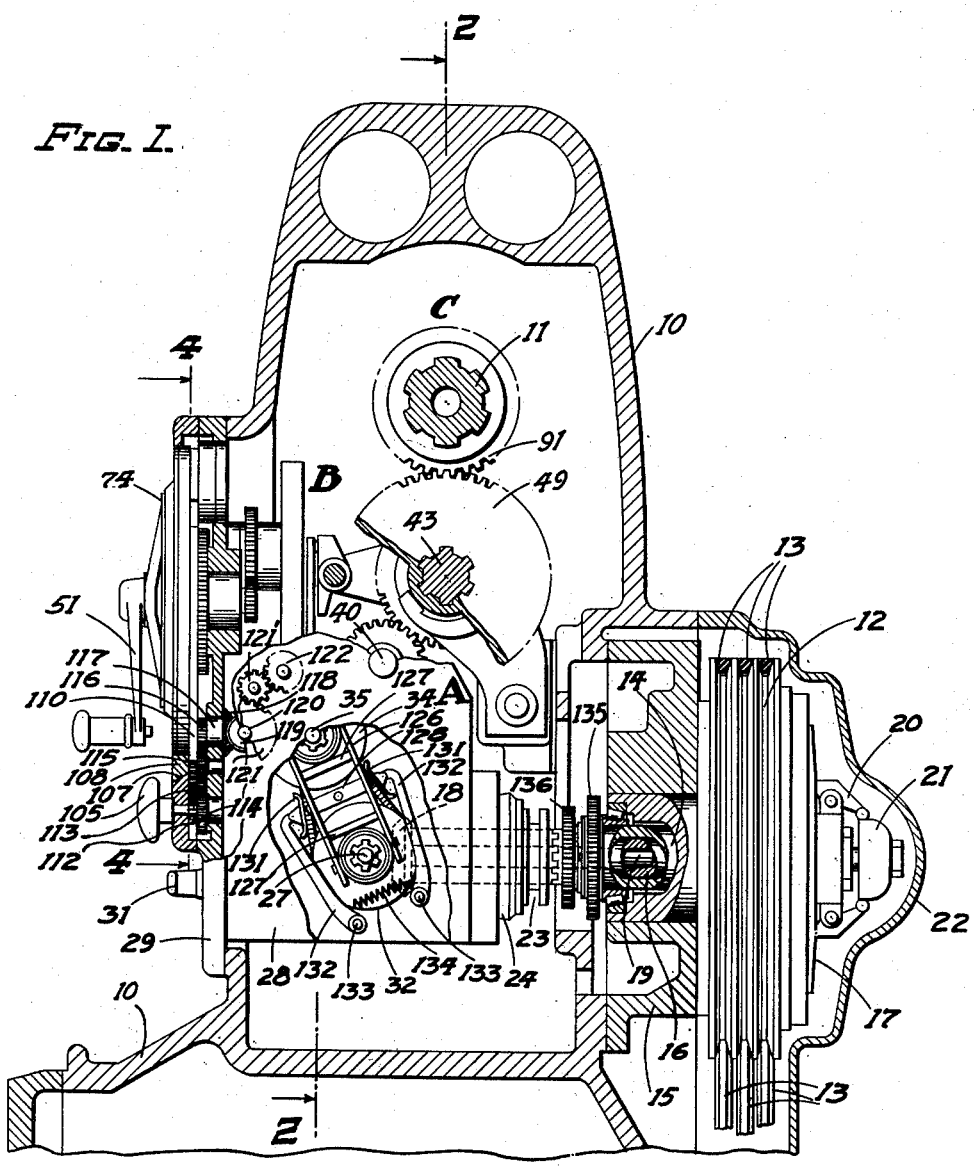
Figure 1 is a vertical transverse sectional view through the upper part of a milling machine incorporating a spindle driving transmission and control mechanism embodying the features of the present invention.

Power for rotating the tool supporting spindle 11 and for actuating the work supporting table, is derived from a power source which may be a constant speed electric motor (not shown) housed within the base of the column 10 and operatively connected to drive a pulley 12 by means of multiple belts 13, as shown in Fig. 1. The pulley 12 is rotatably mounted on the side of the column 10 and is operatively connected to transmit power to the tool spindle 11 at any desired speed within the full compass of the machine, by means of the improved transmission mechanism embodying the present invention.

As shown in Figs. 1 and 2, the improved power transmission mechanism comprises essentially, a positive-infinitely-variable speed changing mechanism A mounted within the column 10 and arranged to transmit power at any selected speed within a predetermined limited range from the pulley 12 to a speed changing gear mechanism B. The speed changing mechanism B is of the selective shiftable gear type and is adapted to provide a series of predetermined driving ratios in progressive or step by step arrangement.

From the speed changer B, power is transmitted to a range changing mechanism C which functions to deliver the power in either a high speed range or a low speed range selectively, to the tool supporting spindle 11. The range changing mechanism C is so proportioned that the full combined compass of the speed changing mechanism B and the infinitely variable mechanism A may be utilized in each of the two ranges without overlapping and without discontinuity between the ranges. Likewise, the intermediate speed changer B is so related to the infinitely-variable speed changer A that the steps between the successive driving ratios of the mechanism B are each covered without overlapping and without discontinuity by the infinitely-variable mechanism A.

By this combination of range changing and step by step speed changing mechanisms with a positive-infinitely-variable speed changer, it is possible to provide for operating the tool spindle 11 at any speed whatsoever within the full compass of the combined mechanisms, and it is further possible, by means of suitable cooperating control mechanism, to predetermine the exact speed at which the spindle will be driven when the pulley 12 is operating at a predetermined constant speed.

As appears in Fig. 1, the power driven pulley 12 is rotatably supported at the right side of the column 10 by means of an inwardly extending hollow sleeve or hub portion 14 that is journalled in a clutch pulley bracket 15 mounted in an opening in the side of the column 10. Within the hollow hub 14 of the power driven pulley 12 there is rotatably mounted a hollow main driving shaft 16 which may be connected selectively at its outer end to the pulley 12 by means of a friction clutch 17, the shaft 16 being connected at its inner end within the column 10, to a bevel pinion 18 constituting part of the spindle driving transmission mechanism housed within the hollow column 10.

For operating the friction clutch 17, there is provided within the hollow driving shaft 16 a clutch operating rod 19, the outer end of which is arranged to actuate clutch engaging fingers 20 by means of a cone 21 upon axial movement of the rod 19. The clutch 17 and its actuating mechanism together with the pulley 12 and belts 13 are enclosed within and protected by a door or cover 22 hingedly mounted on the right hand side of the column 10. The clutch actuating rod 19 is connected, at its inner end within the column, with a grooved clutch operating collar 23 arranged to impart longitudinal movement to the rod 19. Upon moving the clutch actuating rod 19 to the right as shown in Fig. 1 by means of the collar 23, the clutch 17 is engaged to drive the main shaft 16. When the rod 19 is moved to the left by the collar 23, the clutch is disengaged to permit the pulley 12 to turn freely on the shaft 16, and upon further movement of the collar 23 to the left, a friction brake mechanism 24 is engaged. The brake mechanism 24 functions to stop rotation of the shaft 16 and the remainder of the spindle driving mechanism quickly when it is desired to stop rotation of the tool spindle 11.

The beveled driving pinion 18 at the inner end of the main shaft 16 meshes with two similar beveled gears 25 and 26, as shown in Fig. 2, in manner to constitute therewith a reversing mechanism. The gears 25 and 26 are rotatably mounted on a shaft 27 journalled at right angles to the main shaft 10 in a removable frame 28 that is supported within an opening in the left hand side of the column 10 by means of a removable cover plate 29 constituting part of the frame 28 and fastened to the column by means of cap screws or the like (not shown). Splined on the shaft 27 between the beveled gears 25 and 26 is a grooved clutch collar 30 that may be moved to engage either of the gears 25 or 26 by means of a shifter yoke (not shown) that is operatively connected by a rod, extending through the cover plate 29 and provided at its outer end with an operating knob 31. By means of the knob 31 the rod may be moved in or out to shift the clutch collar 30 into engagement with either the gear 25 or the gear 26 for controlling the direction of rotation of the shaft 27 and thereby determining the direction of rotation of the tool spindle 11.

The shaft 27 serves as the power input shaft of the positive-infinitely-variable speed drive mechanism A, which is carried by the frame 28 and, for the purpose of illustration, has been shown as a well known commercial unit generally referred to as the P. I. V. Gear. This mechanism comprises essentially, two pairs of opposed conical wheels having radial teeth between which a toothed chain transmits power, together with means for changing the effective diameters of both pairs of wheels simultaneously to vary the transmission ratio and therefore the speed of the output shaft with respect to the constant speed of the input shaft 27.

As shown in Fig. 2, the power input shaft 27 is provided with a splined portion adapted to slidably receive a pair of oppositely faced conical driving wheels 32 each having radial teeth 33 of equal depth and disposed in staggered relationship with those formed on the opposing face. A pair of identically formed driven wheels 34, slidably mounted on a splined power output shaft 35, are provided with similar staggered teeth 36, the shaft 35 being journalled in the removable frame 28 parallel to the shaft 27. The wheels 34 are driven from the wheels 32 by means of an endless chain 37 which may be of the type constructed in accordance with the disclosure shown in U. S. Patent No. 1,601,663 dated September 28, 1926.

The two pairs of slidable wheels 32 and 34 are cooperatively connected by control mechanism in such manner that when one pair is moved apart, the other pair will simultaneously be brought toward each other. This results in changing the effective diameters of the wheel pairs inversely in manner to vary the transmission ratio of the endless chain and wheels and hence the speed of the output shaft 35 with respect to the constant speed of the input shaft 27.

The power output shaft 35 of the positive-infinitely-variable speed drive mechanism A constitutes the initial driving element of the secondary or intermediate speed rate changing mechanism B that is adjustable by fixed steps in regulating the speed of the spindle 11. As shown, the splined shaft 35 has fixedly mounted thereon a gear 38 that meshes with a gear 39 fixed on a parallel shaft 40 that is journalled in anti-friction bearings in the removable frame 28. Gears 41 and 42 having diameters different than that of gear 39 are also fixed on the shaft 40 for engagement by sliding gears to provide in all, three fixed ratios of transmission adapted to be taken selectively from the shaft 40.

Above the shaft 40 and parallel therewith is arranged a splined shaft 43 that is journalled at its ends in anti-friction bearings in the front and rear walls of the column 10 and that has slidably mounted thereon a gear couplet 44 including gears 45 and 46, and a single sliding gear 47. The shiftable gear couplet 44 and the single gear 47 constitute parts of the secondry or intermediate speed rate changing gear mechanism B, the gears 45 and 46 of the couplet being disposed to be meshed selectively with gears 41 and 39 respectively, and the sliding gear 47 being disposed to be meshed with gear 42 when the couplet 44 is in an intermediate position with both the gears 45 and 46 free from meshing engagement with their complementary gears.

The splined shaft 43 also carries another gear couplet 48 that constitutes part of the tertiary rate changing or range changing mechanism C and comprises a relatively large gear 49 and a pinion 50 which are shiftable to mesh respectively with a small gear 51 or a relatively large gear 52 both of which are fixed on the tool spindle 11. The gear couplet 48 serves to effect a range change to provide for operating the spindle in either a high speed range or a low speed range, each range including all positions of both the positive-infinitely-variable speed drive mechanism A and the speed changing gear shifting mechanism B without overlapping of discontinuity between the ranges. The six different driving ratios provided by the speed changing mechanism B and the range changing mechanism C conjointly, are preferably arranged in geometrical progression in accordance with the usual practice in machine tool transmission mechanisms.

The control mechanism for shifting the various sliding gear couplets and gears to effect the changes in the spindle driving ratio, is similar to that disclosed in the previously mentioned Patent No. 2,240,973. This mechanism includes a manually operable speed changing lever or crank 51, Figs. 1, 3 and 5, fixed on the outer end of a hollow shaft 52 that is journalled in control apparatus carried by the removable cover plate 29, and is provided at its inner end with a speed changing pinion 53. As best shown in Fig. 5, the pinion 53 meshes with a gear 54 preferably formed integrally with a double faced cam plate 55. The outer face of the cam plate 55 is provided with a cam track or groove 56 that is engaged by a cooperating cam follower 57 carried by an arm 58 pinned to a rock shaft 59 that is journalled in a bracket 60. A crank 61 fixed on the inner end of the rock shaft 59 carries a pin 62 that engages a slot 63 formed in a shifting fork 64 slidably mounted on a guide rod 65. The shifting fork 64 engages a groove 66 in the hub of the sliding gear 47 for selectively moving it into or out of mesh with the gear 42.

The other or inner face of the cam plate 55 is provided with a cam track or groove 67 cooperating with a cam follower 68 secured on one end of a shifting fork 69 that is slidably mounted on the guide rod 65. The other end of the shifting fork 69 engages a groove 70 in the gear couplet 44 for shifting the gears 45 and 46 into engagement respectively with the gears 41 and 39, the two cam tracks being so arranged that only one pair of gears may be engaged at any one time.

The gearing between the speed selecting lever or crank 51 and the cam plate 55 is so proportioned that a full turn of the crank is required for each gear changing operation. Accordingly, in order to effect a complete transit of the speed changes possible within the range of the definite speed ratios of the secondary speed changing mechanism B and the range change mechanism C, six complete revolutions of the crank 51 are required, each of the speed changing gears 45, 46 and 47 being meshed twice with its respective cooperating gear 41, 39 or 42 in effecting all of the speed changes in the two ranges. As more fully explained in the previously mentioned Patent No. 2,240,973, the crank 51 carries a latching pin that cooperates with a fixed latching recess for releasably retaining the crank in fixed position at the conclusion of each gear changing operation.

A speed indicator device or dial 74 carrying a continuous circular indicating scale constituted by speed indicia 75 arranged in geometrical progression, is rotatably mounted on the hub of a disc-like member 76 secured to the cover plate 29 concentrically with the crank actuated shaft 52. The drive for effecting rotation of the speed indicator dial 74 is taken from the gear 54 by a meshing gear 77 which is fixed on one end of a shaft 78 that is journalled in the cover plate 29. A gear 79 fixed on the opposite end of the shaft 78 meshes with a ring gear 80 secured to the dial 74, the gearing operating in a manner to effect one complete revolution of the dial for each six revolutions of the hand crank 51.

For shifting the gear couplet 48 to effect a range change, there is provided a hydraulically actuated mechanism controlled by the speed selecting or shifting lever 51 independently of but in coordinated relationship with the cam actuated shifting mechanism for shifting the gears 45, 46 and 47. As best shown in Fig. 5, the hub of the gear couplet 48 is provided with a groove 81 that is engaged by a shifting fork 82 mounted on the end of a piston rod 83 provided with a piston 84 working in a hydraulic cylinder 85 that is mounted within the column 10 adjacent to and parallel with the splined shaft 43 on which the gear couplet 48 is shiftably mounted.

The hydraulic shifting mechanism for the range changer C is controlled by means of a valve 86, Fig. 5, that is mounted on a stub shaft 87 journalled in the cover plate 29 of the control panel adjacent to the speed indicating dial 74 and that functions to energize one or the other end of the cylinder 85 for adjusting the range changer C to either the high or the low range position. For actuating the valve 86, the stub shaft 87 is provided with an arm 88 which extends behind the dial 74 and carries a cam follower 89 that lies within a cam groove or track 90 formed on the inner face of the dial 74. The cam groove 90 is so cut that the valve remains in one position through one half of each revolution of the dial and is shifted to a second position during the other half of the dial revolution.

Fluid under pressure for effecting movement of the piston 84 is obtained from a suitable pressure source such as the usual oil pump (not shown) for supplying lubricant to the machine. The passage of oil under pressure to the range changer controlling valve 86 is under control of a valve 93, the position of which is governed by the operating knob on the speed selecting crank 51. The control valve 93 is so arranged that the passage of fluid to the range change mechanism C is blocked during manual manipulation of the crank 51 and is reestablished upon completion of the dial setting. Upon the establishment of communication between the pump and the valve 86 through the valve 93, fluid under pressure enters the valve 86 through a supply conduit 94, shown diagrammatically in Fig. 5, which is adapted to communicate with either of two arcuately shaped grooves 95 and 96 formed in the rockable valve element 86. A pair of conduits 97 and 98 lead respectively from the valve 86 to opposite ends of the cylinder 85, and a discharge conduit 99 leads from the valve 86 to conduct the discharge fluid to a reservoir (not shown).

With the range changer controlling valve 86 in the position shown in Fig. 5 of the drawings, fluid under pressure passes from the supply conduit 94 through the arcuate groove 95, and the conduit 97 into one end of the cylinder 85 to urge the piston 84 to the position shown in the drawings, wherein the pinion 50 of the couplet 48 is in mesh with the large gear 92 on the spindle 11 to provide the low speed range of operation. As the pinion 50 moves into mesh with the gear 92, fluid in the other end of the cylinder 85 escapes through the conduit 98, and the arcuate groove 96 into the exhaust conduit 99. When the piston 84 reaches the end of its stroke, it uncovers a discharge conduit 100 at the middle of the cylinder 85 to permit the escape of excess fluid into the lubricating system of the machine while retaining the piston in the extreme position. When the valve 86 is rocked to its other position under the action of the cam groove 90 and follower 89, the fluid from the supply conduit 94 passes through the arcuate groove 96, and the conduit 98 into the other end of the cylinder 85 to urge the piston 84 in the opposite direction, whereupon the gear 49 of the couplet 48 meshes with the small gear 91 on the spindle 11 to provide the high speed range. Fluid in the exhaust end of the cylinder 85 then escapes through the conduit 97, the groove 95 and the exhaust conduit 99. At the end of its stroke, the piston 84 again uncovers the discharge conduit 100 to permit the flow of excess fluid into the lubricating system of the machine.

From the foregoing description it will be understood that manipulation of the hand crank or shifting lever 51 will effect a series of coordinated gear shifts which provide three definite gear ratios for driving the spindle in the low speed range and three definite gear ratios for driving the spindle in the high speed range. These six definite speed ratios are obtainable in one complete revolution of the speed indicator dial 74 which requires six revolutions of the speed selecting lever 51. It follows that for each revolution of the lever 51, the dial is rotated one sixth of a revolution and consequently it presents six different speed indicating sectors.

For the purpose of selecting an infinite number of speeds within the full range of the spindle transmission, means are provided for effecting cooperative adjustment of the positive-infinitely-variable speed mechanism A. The manually operable control mechanism for adjusting the positive-infinitely-variable drive mechanism A to vary the transmission speed between the constant speed shaft 27 and the driven or input shaft 35 of the speed changing gear mechanism B, comprises a manually rotatable adjusting lever or knob 105 fixed to the end of a stub shaft 106 journalled in the removable cover plate 29 adjacent to the speed indicating dial 74.

Figure 4:
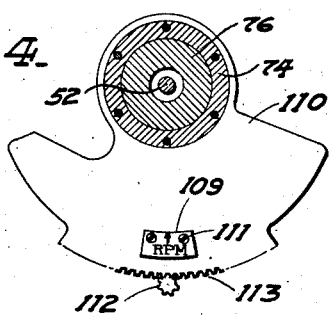
Fig. 4 is a vertical sectional view taken on the line 4—4 of Fig. 1 showing a portion of the speed indicator operatively associated with the indicating dial.
Figure 3:
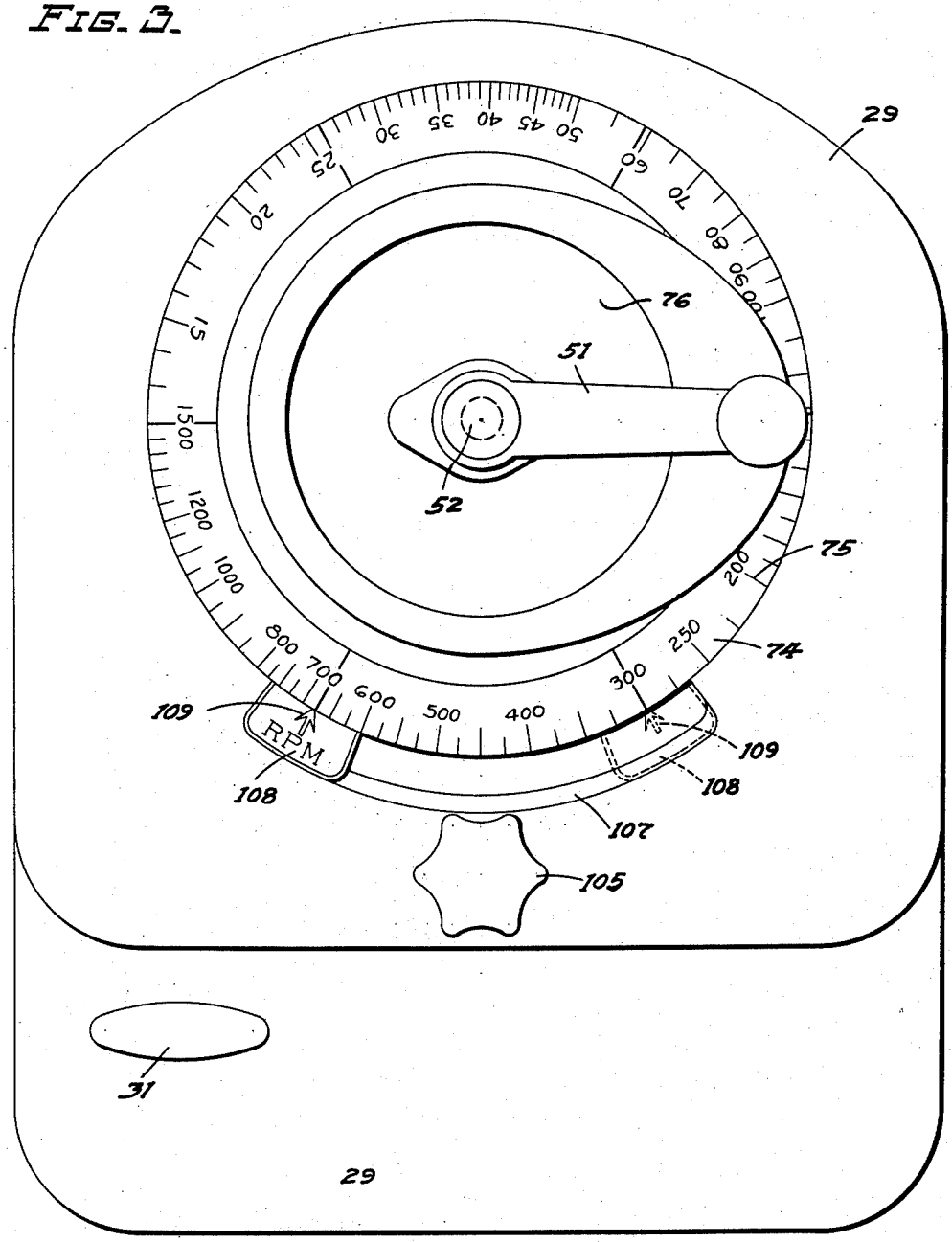
Fig. 3 is an enlarged elevational view of the spindle speed indicating dial, which is mounted on the side of the machine and forms a part of the control mechanism for the improved transmission of the present invention.

As best shown in Fig. 3, an arcuately shaped slot or window 107 formed in the cover plate 29 and disposed between the lower edge of the dial 74 and the knob 105, serves as an opening in which a block 108 carrying an indicating pointer 109 is movable in response to movement of the positive-infinitely-variable drive mechanism under manual manipulation of the knob 105. The pointer 109 is arranged to cooperate with the indicia 75 on the dial in manner to indicate directly on the presented sector of the dial, the actual speed of rotation of the tool spindle in revolutions per minute obtained by the combined adjustments of the crank 51 and the knob 105. As best shown in Fig. 4, the block 108 is secured to the depending portion of a plate 110 by means of cap screws 111 and the plate 110 is journalled for oscillatory movement on the hub of the dial, being retained in sliding contact with the inner face thereof by the ring gear 80. Movement of the plate 110 in accordance with the adjustment of the positive-infinitely-variable drive mechanism A is obtained through the meshing engagement of a pinion 112 fixed on the stub shaft 106 and the teeth of a gear segment 113 formed in the lower arcuate edge of the plate 110. Since the inherent characteristics of the positive-infinitely-variable drive mechanism A are such that speed changes are effected in accordance with a geometrical progression, the indicating pointer 109 follows accurately the geometrically arranged indicia 75 on the dial 74.

The positive-infinitely-variable drive mechanism A may be adjusted manually by rotating the knob 105 to effect changing of the effective diameters of the pairs of conically faced wheels 32 and 34. As shown in Fig. 5, the mechanism for effecting the simultaneous opening movement of one pair of wheels and closing movement of the other pair of wheels includes a gear 114, fixed to the stub shaft 106 carrying the knob 105 and meshing with an idler gear 115 carried by a stub shaft journalled in the cover plate 29 parallel to shaft 106. The idler gear 115 meshes with and drives a gear 116 fixed on the outer end of a shaft 117 that is journalled in and extends through the cover plate 29. A bevel gear 118 fixed on the inner end of shaft 117 meshes with a mating bevel gear 119 fixed on a shaft 120 disposed at right angles to the shaft 117. A gear 121 also fixed on shaft 120 meshes with an idler gear 121' which in turn meshes with a gear 122 fixed on the end of a control screw 123 journalled in the frame 28 and provided with right and left hand threads extending respectively from the middle of the screw outwardly and adapted to urge right and left hand threaded control brackets 124 and 125 in opposite directions respectively when the screw 123 is rotated.

Each of the control brackets 124 and 125 is provided with outwardly extending arms, the ends of which are receivable in longitudinal slots formed in one end of each of four lever elements 126 that are arranged in pairs disposed respectively at opposite sides of the mechanism adjacent to the outer faces of the wheels 32 and 34. Each pair of levers 126 is retained in spaced relationship by rods 127, as shown in Fig. 1, in such manner that the individual levers lie on opposite sides of the two shafts 27 and 35. Each pair of spaced lever elements 126 is pivotally mounted on a fulcrum member 128 that lies between the shafts 27 and 35 and is disposed perpendicular to them. When the control brackets are urged in opposite directions by rotation of the control screw 123, the pairs of levers 126 will be displaced by pivoting in opposite directions on the fulcrum members 128. This effects a drawing together of one pair of wheels under the action of thrust bearings journalled in bearing yokes 129 pivotally supported by the levers 126, and a spreading of the other pair, which results in a variation of the pitch diameter of both pairs of wheels and hence varies the speed of the output shaft 35 of the positive-infinitely-variable drive mechanism A with respect to the input shaft 27. The squeezing action produced by the one pair of wheels in moving together urges the chain 37 outwardly along the teeth formed in the faces of the conical wheels. Simultaneously with the application of pressure to one pair of wheels, the pressure of the thrust bearings contacting the other pair of wheels is relieved due to the outward movement of the opposite ends of the levers 126 and hence the chain 37 can readily be drawn inwardly along the teeth formed on the faces of this pair to alter the effective pitch diameter of the wheels.

Adjustable chain tightening means is provided in the form of a screw 130 journalled in the frame 28 and having right and left hand threaded portions adapted to receive similarly threaded portions of the fulcrum members 128 so that when the screw 130 is rotated both pairs of wheels may be drawn toward each other to provide means for adjusting the initial tautness of the chain 37. The correct operating tension of the chain is maintained at all speed ratio settings by means of a pair of hardened shoes 131, Fig. 1, that are pivotally mounted on arms 132 which are pivoted on shafts 133 journalled in the frame members 28. The shoes 131 ride lightly on the opposite runs of the chain 37 under the constant pressure of springs 134 the ends of which are connected respectively to the arms 132 to normally draw them toward each other.

The adjusting of the entire transmission mechanism to provide any preselected speed of rotation for the tool spindle 11 may be effected in the following manner. Assuming, for the sake of illustration, that the desired speed of spindle rotation is 500 R. P. M., the handle of the shifting lever 51 (Fig. 3) is grasped and pulled outwardly a sufficient distance to free the latching pin carried thereon from the cooperating latching recess. The lever 51 may then be rotated either clockwise or counterclockwise through one or more complete revolutions until the sector on the dial 74 containing the 500 indicium reaches a position above the window or slot 107 formed in the cover plate 29 and where the handle of the crank 51 will be in a position in which the latching pin may be introduced into its latching recess upon the release of the crank handle. The knob 105 may then be rotated either clockwise or counterclockwise, depending upon whether the indicator 109 carried by the block 108 lies to the left or to the right of the 500 mark on the dial 74, in order to bring the arrow 109 directly into line with the desired speed indicium. When this position is reached, the adjustment is complete and the cutter may be engaged by the work with assurance that it will be rotated at the desired speed of 500 R. P. M.

If now it should be deemed advisable to alter the speed of the cutter slightly, this may be accomplished without interfering with the cutting operation by merely rotating the knob 105, it being turned in a counterclockwise direction to increase the speed, or in a clockwise direction to decrease the speed. If the range obtainable by moving the indicator 109 from its initial position to one or the other end of the slot 107, as indicated in full and dotted lines in Fig. 3, is insufficient for the desired speed change, the crank 51 may be rotated one revolution either clockwise or counterclockwise, to step the speed up to the next higher step or down to the next lower step, as may be necessary.

To insure against clashing of gears and interference between them during the speed selecting operation performed by the manual manipulation of the crank 51 and to simplify the shifting operation, a hydraulic control system such as is shown in the previously mentioned Patent No. 2,240,973, is preferably incorporated in the machine. The hydraulic control system is so arranged that the operation of disengaging the crank retaining pin by pulling the operating knob on the crank 51 outwardly, results in the shifting of the valve 93 to a position wherein the supply of fluid under pressure is cut off from the range change control valve 86 and is directed to a cylinder containing a piston operative to effect disengaging movement of the main drive clutch 17 to interrupt the driving action. When the clutch 17 has been moved to its disengaged position, the clutch actuating piston uncovers a port in the cylinder which permits fluid under pressure to flow to a second cylinder containing a piston adapted to effect the engagement of a secondary friction clutch that constitutes a part of the auxiliary slow speed drive mechanism.

Power for turning the gearing at slow speed is derived from a gear 135 that is secured on the constantly rotating pulley sleeve 14 and is constantly in mesh with a gear forming part of the auxiliary slow speed drive mechanism. The auxiliary slow speed drive mechanism includes a power output gear that is in constant mesh with a gear 136 secured to the main driving shaft 16 and operative to turn the variable speed device A and speed change gears B at low speed when the friction clutch of the slow speed drive mechanism is engaged, to facilitate engagement of the sliding gears of the speed change mechanism B while they are being shifted by the cam actuated shifting mechanism. After the shifting operation has been completed, the lever latch is reengaged with its latching recess, thereby shifting the valve 93 to the position in which the secondary friction clutch is disengaged and the pressure is readmitted to the range changer control valve 86 for effecting shifting of the range change mechanism C.

The gear 135 also provides power for driving the work supporting members (not shown) of the machine at rapid traverse rate and for driving a gear pump (not shown) to provide fluid under pressure for lubricating the working parts of the machine and for actuating the hydraulic control mechanism. The auxiliary slow speed drive mechanism together with the work supporting members and gear pump are fully shown and described in the previously mentioned Patent No. 2,240,973.

From the foregoing explanation of the construction and operation of a preferred embodiment of the invention, it is apparent that there has been provided an improved power transmission and control system that is capable of effecting infinitely variable speed changes throughout a wide range of operation with facility and accuracy and that has marked advantages over systems effecting only a few definite speed ratios. Furthermore, the transmission of power is effected through a positive drive train, and the infinite speed variation is provided by a positive-infinitely-variable drive mechanism cooperating with a fixed step speed changer, the infinitely variable drive mechanism being arranged to be driven directly by the power source at relatively high speed and low torque. In addition, the control systems for both the fixed step speed changer and the infinitely variable mechanism cooperate in manner to indicate directly the exact speed resulting from the combined settings of the several mechanisms.

While the invention has been shown and described as applied to the driving train for operating the tool spindle of a milling machine, it is to be understood that it may be incorporated with equal advantage in the transmission mechanism for any other movable member of a machine tool, such for example as the table of a milling machine, where it is desirable to provide simple and effective means for effecting infinitely variable adjustment of the speed of movement of the member with respect to a constant speed power source.

Although a particular structure has been shown and described in considerable detail as exemplary of the manner in which the invention may be practiced, it will be apparent to those skilled in the art to which this invention relates, that various modifications of the structure herein shown and described may be effected without departing from the spirit and scope of the invention as defined in the subjoined claims.

An illustrative embodiment of the invention having now been set forth in manner to fully explain the principles thereof, the invention is hereby claimed as follows:

1. In a machine tool transmission and control mechanism, a driven member, a range changing mechanism connected to drive said driven member in either a high speed range or a low speed range, a speed changing mechanism connected to drive said range changing mechanism at any one of a plurality of stepped speeds within either one of said ranges, a positive-infinitely-variable speed drive mechanism connected to drive said speed changing mechanism at any speed within any one step of said stepped speeds, a power source connected to drive said variable speed mechanism at a predetermined constant speed, control apparatus including a single shifting lever operatively connected to shift said speed changing and range changing mechanisms in coordinated manner, a speed indicating dial carrying speed indicia associated with said shifting lever in manner to be turned thereby to a plurality of positions corresponding to the various speed ratios effected by shifting said speed changing and range changing mechanisms, an adjusting lever operatively connected to adjust said variable speed mechanism, and a speed indicating pointer associated with said variable speed mechanism adjusting lever and movable over said speed indicating dial in manner to indicate thereon the speed of said driven member resulting from the combined settings of said mechanisms.

2. A machine tool transmission and control mechanism, comprising a driven member, a gear changing mechanism operatively connected to drive said driven member at any one of a plurality of predetermined speed ratios, control mechanism for adjusting said gear changing mechanism including a speed indicating device carrying speed indicia and movable to a plurality of positions corresponding to the adjustment of said gear changing mechanism, a positive-infinitely-variable speed drive mechanism operatively connected to drive said gear changing mechanism, a constant speed power source connected to drive said variable speed mechanism, and means to control said variable speed mechanism including a speed indicator disposed to cooperate with said speed indicating device to indicate thereon the exact speed at which said driven member is operating.

3. The combination with a machine tool including a driven member, of a transmission for driving said member, said transmission including, a constant speed power source, a positive-infinitely-variable drive mechanism, a speed changing mechanism, a range changing mechanism, a control mechanism including a single shifting lever operatively connected to shift said speed changing and said range changing mechanisms in coordinated manner, a speed indicating dial carrying speed indicia associated with said shifting lever in a manner to be turned thereby to a plurality of positions corresponding with the various speed ratios effected by shifting said speed and range change mechanisms, and a control mechanism including an indicator operatively connected to adjust said positive-infinitely-variable drive mechanism, said indicator being adapted to register with said dial in a manner to indicate accurately thereon the speed of said driven member resulting from the combined setting of said control mechanisms.

4. In machine tool, the combination with a base and a driven member, of a transmission for driving said member at any desired speed within the range of said transmission which comprises, a constant speed power source, a positive-infinitely-variable drive mechanism driven by said constant speed power source, a gear changing mechanism including a plurality of shiftable gears adapted to cooperate to produce a plurality of definite speed ratios connected to be driven by said positive-infinitely-variable mechanism, a control apparatus including a manually operable lever for shifting said gear changing mechanism, a movable dial operatively associated with said control apparatus to indicate the selected position of said control apparatus, a control apparatus including a manually operable member operative to adjust said positive-infinitely-variable drive mechanism, and an indicator operatively associated with said last named control apparatus and movable over said dial to indicate accurately the selected speed of said transmission.

5. In a machine tool having a driven member and a source of power, a transmission and control apparatus for operatively connecting said source of power to drive said driven member at a selected speed, comprising a stepped ratio speed changing mechanism connected to said driven member and operative to transmit power at any one of a geometrically progressive series of driving ratios, a control system for said stepped ratio speed changing mechanism including a dial carrying speed indicating indicia and movable to a plurality of positions corresponding to the settings of said stepped ratio speed changing mechanism for effecting the various driving ratios of said geometrical series, a positive-infinitely-variable ratio speed changing mechanism connected to transmit power from said source to said stepped ratio speed changing mechanism at any driving ratio within a range extending from one to another of adjacent ratios in said geometrical series, and a control system for said variable ratio speed changing mechanism including an indicator movable in cooperating relationship with said dial in geometrically progressive manner corresponding to the settings of said variable ratio mechanism, whereby said driven member may be actuated at any speed within the full range of said transmission apparatus the speed being indicated directly on said dial.

6. In a machine tool transmission and control mechanism, the combination with a driven member, a range changing mechanism, a speed changing mechanism, and a positive-infinitely-variable drive mechanism operatively connected in series relationship, of a constant speed power source, a control means for effecting adjustment of said range changing mechanism, a control means for effecting adjustment of said speed changing mechanism, a control means for effecting adjustment of said positive-infinitely-variable drive mechanism, a single manually operable element for effecting coordinated operation of said first and second named control means, a dial member operatively associated with said single manually operable element and adapted to indicate the speed selected by adjustment of said element, a second manually operable element for effecting the operation of said third named control means, and an indicator operatively associated with said second named manually operable element adapted to register with said dial to indicate thereon the speed of said driven member obtained by the selected setting of both of said manually operable elements.

7. A machine tool transmission and control mechanism comprising, a driven member, a range change mechanism operatively connected to drive said member in either a high or a low speed range, a gear changing mechanism operatively connected to drive said range change mechanism, said gear changing mechanism including a plurality of gears shiftable to establish any of a plurality of definite speed ratios, a control apparatus for effecting coordinated range and speed changes, a movable dial operatively connected with said control apparatus in a manner to be moved to a plurality of positions corresponding to the various speed ratios effected by movement of said control apparatus, a positive-infinitely-variable drive mechanism operatively connected to drive said gear changing mechanism, said positive-infinitely-variable drive mechanism including means shiftable to vary the speed of said mechanism between successive speed ratios established by said gear changing mechanism, a control apparatus for effecting adjustment of said positive-infinitely-variable drive mechanism, an indicator operatively connected to said last named control apparatus in a manner to be moved over said dial to indicate thereon the speed of said driven member resulting from the combined settings of said control apparatus, and a constant speed power source operatively connected to drive said positive-infinitely-variable drive mechanism.

8. In a machine tool, a frame, a working member supported by said frame, a gear changing transmission mechanism operatively connected to drive said working member, an infinitely variable transmission mechanism operatively connected to drive said gear changing transmission mechanism, adjusting means arranged to operate said gear changing mechanism, a speed indicating scale associated with said gear changing adjusting means and movable thereby in accordance with the adjustment of said gear changing mechanism, adjusting means arranged to operate said infinitely variable mechanism, and a speed indicating pointer associated with said infinitely variable adjusting means and arranged to move in cooperative relationship with said scale in accordance with the adjustment of said infinitely variable mechanism, the arrangement being such that said working member may be driven at any speed within a predetermined range by cooperative adjustment of said transmission mechanism, the resulting speed being indicated directly by said pointer upon said movable speed indicating scale.

9. In a machine tool, an operating member, means to drive said member including a speed changing power transmission mechanism, said mechanism comprising a shiftable change gear set, selectively operative means arranged to shift said change gear set, a circular speed indicating dial presenting continuously arranged speed indicating indicia, means associated with said shifting means and operatively connected to turn said dial by increments in accordance with the changes in speed effected by said shifting means, an infinitely variable drive mechanism interconnected with said change gear set, means arranged to adjust said infinitely variable drive mechanism, a speed indicating pointer associated with said dial, and means associated with said adjusting means and operative to move said speed indicating pointer relative to said dial, the arrangement being such that the final speed resulting from the combined operation of said change gear set and said infinitely variable drive mechanism will be indicated directly on said dial by said speed indicating pointer.

JOSEPH B. ARMITAGE.